United States Patent [19]

Takenaka

[11] Patent Number: 5,177,343
[45] Date of Patent: Jan. 5, 1993

[54] SYMBOL READER USING DIFFERENTIATING CIRCUIT FOR LIGHT BEAM FOCUSING

[75] Inventor: Shinya Takenaka, Osaka, Japan

[73] Assignee: Sumitomo Electric Industries, Ltd., Osaka, Japan

[21] Appl. No.: 630,252

[22] Filed: Dec. 19, 1990

[30] Foreign Application Priority Data

Dec. 22, 1989 [JP] Japan .................................. 1-334551

[51] Int. Cl.5 ........................ G06K 7/015; G06K 7/10; G01J 1/20
[52] U.S. Cl. .................................... 235/436; 235/455; 235/467; 250/201.5; 250/201.7; 356/123
[58] Field of Search .................... 369/54, 58, 44.25; 235/467, 476, 436, 437, 455; 356/122, 123, 125; 250/201.1, 201.4, 201.5, 201.7

[56]  References Cited

U.S. PATENT DOCUMENTS

| 3,967,110 | 6/1976 | Rogers et al. | 356/125 X |
| 4,183,642 | 1/1980 | Fukuoka . | |
| 4,203,031 | 5/1980 | Kamachi et al. . | |
| 4,368,526 | 1/1983 | Hangae et al. | 250/201 |
| 4,383,274 | 5/1983 | Inuiya | 358/227 |
| 4,577,095 | 3/1986 | Watanabe | 250/201 |
| 4,578,571 | 3/1986 | Williams | 235/472 |
| 4,593,322 | 6/1986 | Abel . | |
| 4,740,675 | 4/1988 | Brosnan et al. | 235/466 |
| 4,807,992 | 2/1989 | Noguchi et al. | 250/201.4 X |
| 4,808,804 | 2/1989 | Kricherer et al. | 235/462 |
| 4,818,886 | 4/1989 | Drucker | 250/566 |
| 4,861,973 | 8/1989 | Hellekson et al. | 235/467 |

FOREIGN PATENT DOCUMENTS

| 0267549 | 5/1988 | European Pat. Off. . | |
| 2309932 | 11/1976 | France . | |
| 56-35111 | 4/1981 | Japan | 356/123 |

Primary Examiner—John W. Shepperd
Assistant Examiner—Edward H. Sikorski
Attorney, Agent, or Firm—Cushman, Darby & Cushman

[57]  ABSTRACT

A symbol reader for reading symbols on a symbol surface. An optical system including a laser, condensing lens and scanning mirror illuminate a symbol surface to be read with a laser beam, scanning across the symbol surface. A transducer measures the amount of light reflected from the symbol surface. A differentiating circuit develops a differential coefficient indicative of the change of light intensity as light scans the symbols being read. A control system adjusts the optical system illuminating the symbol surface so as to maximize the differential coefficient, thereby minimizing the diameter of the light beam to allow for adequate reading of the symbol surface at variable distances.

15 Claims, 3 Drawing Sheets

FIG. 2
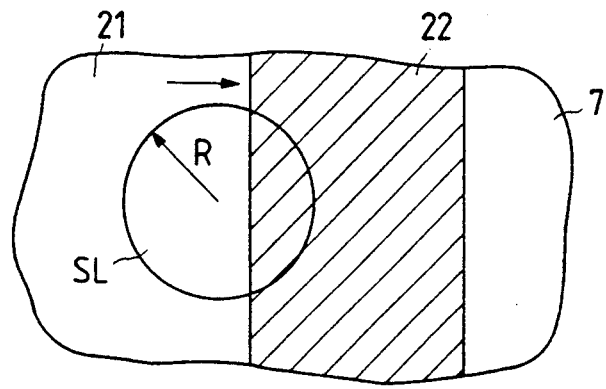
FIG. 3(a)
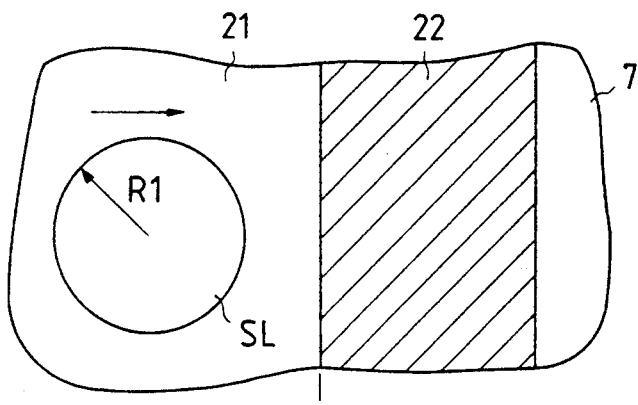
FIG. 3(b)
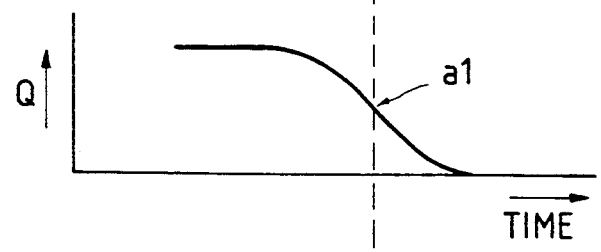
FIG. 3(c)

SYMBOL READER USING DIFFERENTIATING CIRCUIT FOR LIGHT BEAM FOCUSING

BACKGROUND OF THE INVENTION

1. Field of the Invention

This invention is directed to an optical device for scanning and interpreting (reading) symbols on a distant surface. Typical symbols which can be scanned and interpreted are bar codes, numbers, letters, characters and the like.

2. Description of the Related Art

There are now various types of optical scanning devices. Two of the most well known types of optical scanning devices are bar code readers and optical character readers (OCR). In general, optical scanning devices scan a surface and interpret symbols such as, for examples, bar codes, letters, numbers and characters. In the case of certain optical scanning devices, such as an OCR, the surface being read is always at a predetermined position. Typically, a document being scanned is placed on a glass that is at a fixed position. An optical system of the OCR knows exactly where the document is located. Its optical system can be optimized for reading the paper at a fixed distance. However, there are situations in which an optical scanning device must read symbols which are not located at a predetermined distance from the scanning device, and may be moving with respect to the scanning device. For example, it may be desirable to read symbols affixed to objects being transported on a moving conveyor belt. The symbols must be read without any part of the scanning device coming into physical contact with the symbol's surface. Additionally, the distance between the optical scanner and the symbol being scanned can vary, depending upon the physical dimensions of the object to which the symbol is attached.

In one known arrangement for scanning a remote surface, a laser beam is directed toward a polygon mirror or a galvano mirror which rotates about an axis. As the mirror rotates the symbol surface is scanned by the laser light reflected from the rotating mirror. The laser light may be light from a semiconductor laser light source transmitted through a condensing lens. Laser light reflected from both the symbol and the surface on which the symbol is affixed is detected utilizing photo detecting means as optoelectric transducing elements. In the case of a scanner for scanning a bar code on a remote surface, a bar code normally includes a series of spaced apart white and black lines, called "bars", of various lengths and widths. Because the laser beam is directed at a rotating, multisurfaced mirror, the reflected light moves across the series of bars, thereby "scanning" the symbols which comprise the code. The laser beam travels in a direction orthogonal to the individual bars which make up a bar code. The photo detecting means receives intensive light reflected from white bars, and less intensive light reflected from black bars and generates an electrical signal indicative of intensity. This electrical signal is processed into a two-level signal (a signal having one of only two possible levels) based on some predetermined function of intensity. In this manner, the optical scanner "reads" the bar code.

A "read distance" is the distance between the symbol being scanned and the scanning device within which the device can adequately read the symbol. The range between the lower limit and the upper limit of the scanner's read distance is called the scanner's "read range". It is desirable that this read range be as large as possible.

In the type of symbol reader that contains a condensing lens for condensing light beams emitted from a semiconductor laser light source, maximizing the read range presents a difficult design tradeoff. If the focal point of the condensing lens is set to infinity (infinite focal length), so as to obtain a perfectly paraxial light beam, it is not possible to reduce the diameter of the light beam enough to allow for adequate resolution of the symbols (even using a laser beam). On the other hand, if the condensing lens is set to a predetermined short focal length, so as to produce a very small beam at the surface to be read, when the surface to be read is even slightly displaced from the lens focal point, the beam will become so wide as to degrade the resolving power of the scanner.

In typical known bar code readers, the focal point is generally set at or near the center of the read range. The bar code reader designed in this manner, however, has various operational problems. When the optical scanner is operated too close to the symbol surface, the scan width of the laser beam on the symbol surface is small. Thus, the visual field of the bar code reader becomes narrow. The result is that under this condition, the bar code reader fails to read "long" bar codes. On the other hand, when the optical scanner is operated at too great a distance from the symbol to be read, the diameter of the laser beam on the symbol surface, is so large that the resolving power of the lens is poor, and the bar code reader cannot read "narrow" bar codes. In order for an operator to find an optimum read range for reading narrow bar codes, he must manually adjust the distance between the scanner and the symbol being scanned or manually adjust the lens. Such a requirement reduces worker efficiency, because the operator must spend additional time making such adjustments. When the bar code reader used is of the hand-held type, work efficiency is remarkably reduced. In the case of a bar code reader that is fixedly installed, the work required to adjust the read range is quite complicated.

One technique for attempting to solve this problem is disclosed in Japanese Patent Unexamined Publication No. 63-83886. An infrared light emitting diode (LED) emits rays of light toward the symbol surface of an object. A photo sensitive diode (PSD) receives the reflected light from the symbol surface. A distance between the bar code reader and the symbol surface is then measured from the detected positions of the reflected light (triangle measurement). In this known arrangement, a condensing lens is used to condense the reflected light from the symbol surface and to form a bar code image on the two dimensional image sensor. An optical position of the condensing lens is changed according to the measured distance data. Thus, the lens is automatically focused. In this manner, the read range is widened. The distance measuring means, including the LED and PSD, are essential elements to the scanning device. Such measuring means add to the overall cost of the scanning device. Moreover, power dissipation is increased, thus making the disclosed apparatus unsuitable for a Thus, it would be advantageous to utilize a scanning device which does not require the LED or the PSD.

Another known arrangement is set forth in U.S. Pat. No. 4,818,886 directed to a bar code reader. Optical elements, such as a light source, photo sensor, stop member and lens are controlled in order to obtain an exact read of bar codes. Resolving power is improved by fabricating a condensing lens from a resilient material. The curvature of the lens is varied by a tubular piezoelectric element. This element is used to change the focal distance of the condensing lens, thereby improving the lens resolving power (see FIG. 4 of U.S. Pat. No. 4,818,886).

There are several disadvantages to this technique, however. First, the piezoelectric element used must be specially shaped. The special shaping results in added cost. Additionally, the drive technique used to drive the element is complicated.

U.S. Pat. No. 4,818,886 discloses one arrangement for resolving the changing read distance problem. The position of the light source is changed by selectively energizing an infrared light emitting diode (LED) from among those of an LED array that are obliquely disposed with respect to an optical axis (see FIGS. 12 and 13 of the patent). However, an image forming position on the photo sensor is not coincident with the image forming the LED on the optical axis is selected. Thus, an exact read can not be obtained.

SUMMARY OF THE INVENTION

An object of the present invention is to provide an optical device which accurately reads symbols over a broad read range without increasing its cost and complexity over known devices.

To achieve this objective, the present invention provides a symbol reader for reading symbols such as bar codes, numbers, letters and other such characters. The symbol reader comprises a light source, a condensing lens for condensing light beams emitted from the light source, a mirror which reflects the light emitted from the light source onto the symbol, and an optoelectric converting element for converting the light beam reflected from the symbol surface into an electric signal. Means are provided for obtaining a differential coefficient of an amount of reflected light from an electric signal derived from the optoelectric transducing element. Control means are provided for adjusting the position of the light source and/or the condensing lens along an optical axis of the condensing lens so as to maximize the amplitude of the differential coefficient.

A symbol affixed to an object a finite distance away from the inventive symbol reader is scanned by the light beam emitted from the light source and transmitted through the condensing lens. Light transmitted through the condensing lens forms essentially a circular spot with a finite diameter on the surface to which a symbol is attached. As the reflecting mirror rotates, the spot of light also moves. When the spot crosses from the surface portion (without the symbol) to the symbol itself, the magnitude of the reflected light also changes. This change is caused by the differences in reflectivity of the surface and the symbol attached to the surface. This change in the amount of reflected light is detected by the optoelectric scanning element. As the diameter of the spot formed by the light beam increases, the time it takes for the magnitude of reflected light to change increases as well. Conversely, when the diameter of the spot decreases, the change in the amount of light reflected takes place in a shorter period of time. The smaller the diameter of the light beam, the greater the detail with which the symbol may be read. This helps to ensure precise reading of the symbol.

A change in the amount of reflected light that is detected by the optoelectric transducing element is translated into a differential coefficient of a signal. In response to this signal, the control system directs movement of either the light source or the condensing lens to maximize the amplitude of the differential coefficient. By maximizing the amplitude of the differential coefficient, the diameter of the light beam reflected from the symbol reader's rotating mirror onto the symbol surface is minimized.

BRIEF DESCRIPTION OF THE DRAWINGS

FIG. 2 is a diagram showing an image of a spot that is formed on the symbol surface by the laser beam. This figure is useful in explaining the spot and the differential coefficient; and FIGS. 3 (a), 3(b), and 3(c) and 4(a), 4(b), and 4(c) are diagrams useful in explaining the operations of the bar code reader when the diameter of the light beam on the surface of the symbol is large and small.

DETAILED DESCRIPTION OF THE PRESENTLY PREFERRED EXEMPLARY EMBODIMENTS

A preferred embodiment of a symbol reader in accordance with the present invention will be described in detail with reference to the accompanying drawings.

Figure 1:
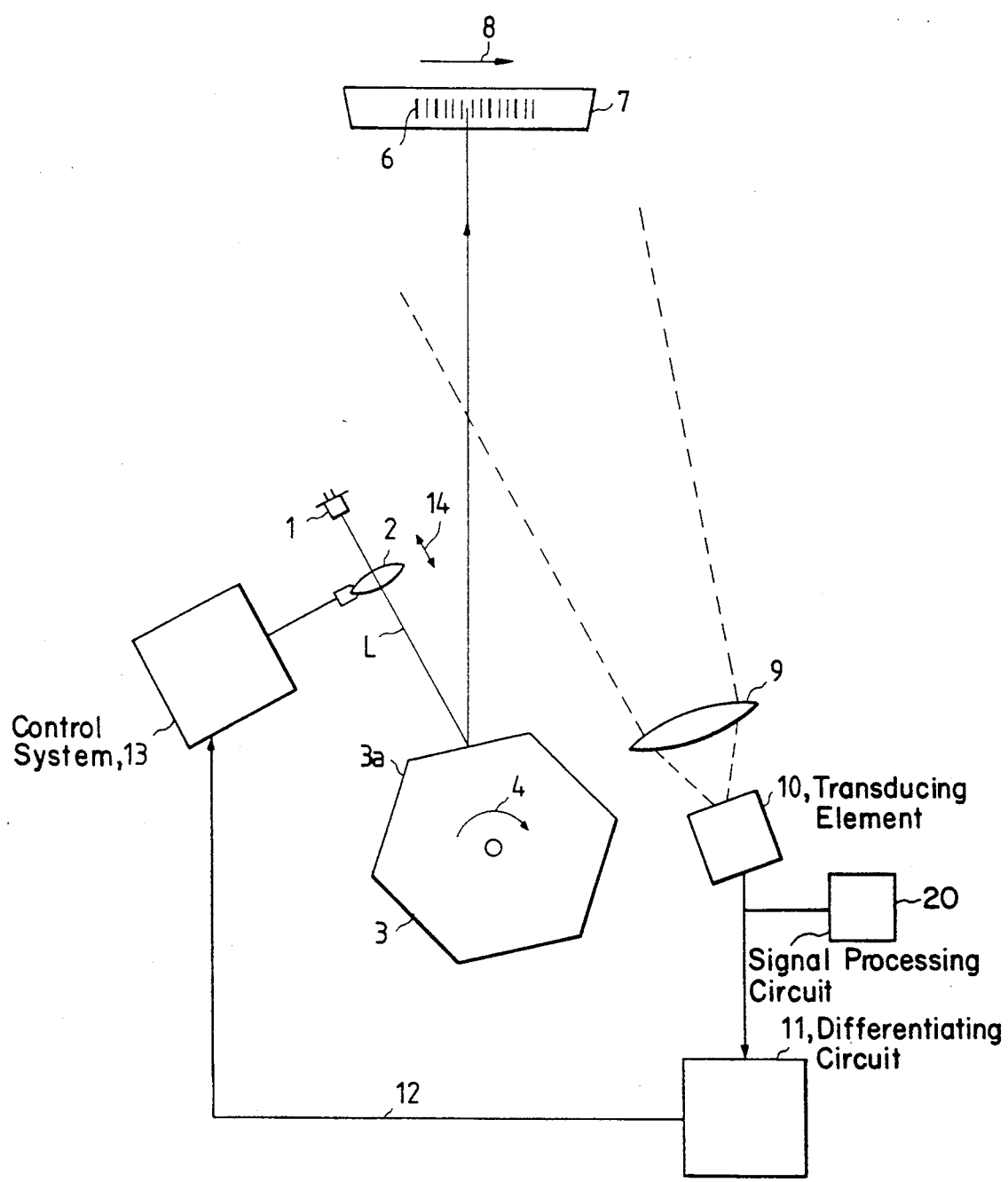
FIG. 1 is a plan view showing a basic arrangement of a bar code reader as an embodiment of the present invention.

FIG. 1 is a plan view showing a basic arrangement of a bar code reader as an embodiment of the present invention. A laser light L emitted by a semiconductor laser 1 directed through a first condensing lens 2 and is incident on a polarizing and reflecting surface 3a of a polygon mirror 3. The polygon mirror 3 is a regular hexahedral member whose side walls serve as polarizing and reflecting surfaces. The mirror 3 is rotated at a fixed angular velocity in the direction of an arrow 4. With rotation of the polygon mirror 3, an angle of incidence of the laser beam L on reflecting surface 3a varies with time so that a surface 7 on which a symbol such as a bar code 6 is affixed is scanned by the laser beam L after reflection from the surface, at a fixed velocity in a direction indicated by arrow 8. With the rotation of the polygon mirror 3, the laser beam L is incident successively on the different polarizing and reflecting surfaces which comprise polygon mirror 3. As a result, the symbol surface 7 is repeatedly scanned synchronously with the rotation of the polygon mirror 3. The reflected light from the symbol surface 7 is focused on an optoelectric transducing element 10 by way of a second condensing lens 9. Transducing element 10 provides an electrical signal indicative of the light impinging on it. Thus, variations in the electrical signal from transducing element 10 can convey information as to the symbols on symbol surface 7 being read. A signal processing circuit 20 interprets the electrical signal so as to extract the symbol information. This signal processing circuit may advantageously be a programmed microprocessor-based circuit.

Also, the electrical signal from transducing element 10 is used to feedback control the optical system which illuminates symbol surface 7. The electrical signal from transducing element 10 is coupled to a differential circuit 11 which develops a differential coefficient based on the electrical signal from transducing element 10. A maximum or minimum amplitude value of the differential coefficient is stored. The differential coefficient as stored is applied through a line 12 to a control system 13. Control system 13 adjusts the position of the condensing lens 2 so as to maximize the differential coefficient. By maximizing the differential coefficient, the spot diameter of the laser beam L on the symbol surface is minimized. This optimizes the read condition.

FIG. 2 is a diagram showing an image of a spot of light SL that is formed on the symbol surface 7 by the laser beam L. For simplicity of explanation, it is assumed that the total power P of the laser beam L is concentrated within an area of the circular spot SL of radius R, and is uniformly distributed over the area. Further, it is assumed that the reflectivity in a portion of a white bar 21 (background portion) is 100%, and that in a portion of a black bar 22 as a symbol portion (shaded in FIG. 2), an amount Q of the reflected light is expressed $$Q = P \times (S/R^2)$$

where S is an area of the spot SL extending over the area of the white bar 21.

If the power P is fixed, an amplitude $|dQ/dt|$ of a differential coefficient $dQ/dt$ of the reflected light amount Q is determined by an amplitude $|d/dt|$ of a differential coefficient $d/dt$ of a ratio of the area S of the white bar portion to the total area $R^2 = S/R^2$. It is evident that the amplitude $|d/dt|$ of the differential coefficient becomes larger as a movement of the spot SL with respect to the radius R is larger. Therefore, if a velocity "v" of the spot SL when it is moved is fixed, the amplitude $|dQ/dt|$ of the differential coefficient becomes larger as the radius R is larger.

FIGS. 3(a), 3(b), and 3(c) are useful in explaining the operation of the bar code reader when the radius R1 of the spot SL is relatively large. FIG. 3(a) resembles FIG. 2. FIG. 3(c) is a graph showing a variation of the amplitude $|dQ/dt|$ of the differential coefficient that is detected by the differential circuit 11, with respect to time. When the spot SL moves from the white bar 21 to the black bar 22, a curve indicative of the variation of the light amount Q descends as indicated by a character a1 shown in FIG. 3(b). Therefore, the amplitude $|dQ/dt|$ of the differential coefficient is varied to reach the peak at a time point near time t1 that the center of the spot SL crosses the boundary between the white bar 21 and the black bar 22.

Figure 4A:
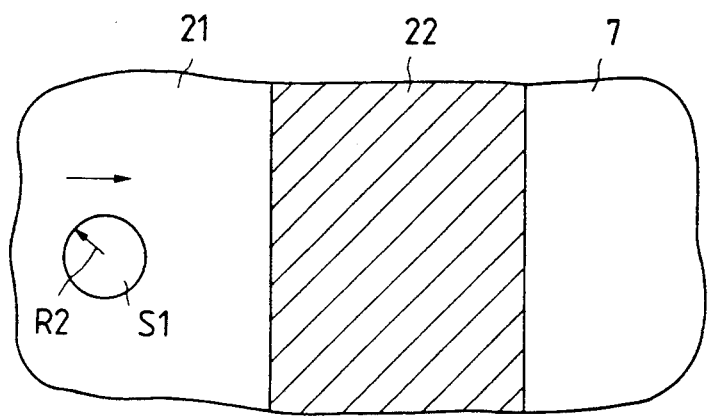
Figure 4B:
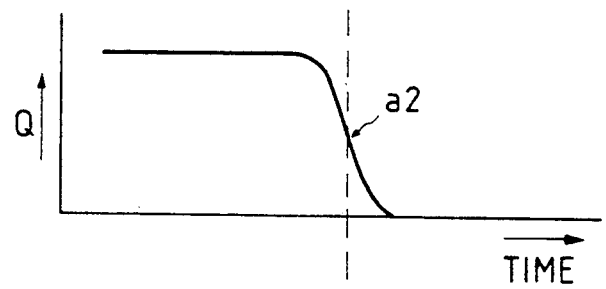
Figure 4C:
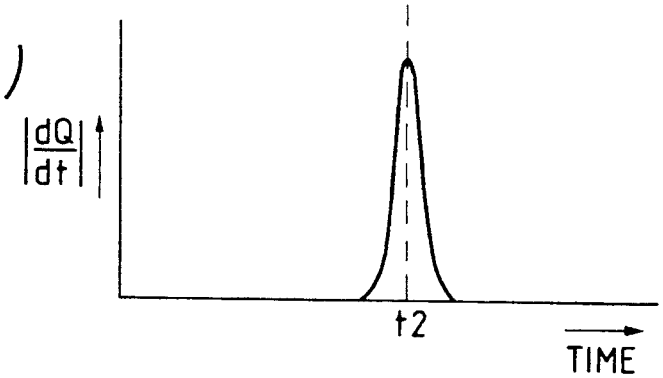

FIGS. 4(a), 4(b), and 4(c) are useful in explaining the operation of the bar code reader when the radius R2 of the spot SL is relatively small. FIGS. 4(a), 4(b), and 4(c) resemble those of FIGS. 3(a), 3(b), and 3(c), respectively. In this instance, since the radius R2 of the spot SL is small, the light amount Q abruptly descends as indicated by a character a2, when the spot SL moves from the white bar 21 to the black bar 22. Therefore, the amplitude $|dQ/dt|$ of the differential coefficient as detected by the differential circuit 11 is varied to have a sharp peak at a time point near time t2 that the center of the spot SL crosses the boundary between the white bar 21 and the black bar 22. The amplitude $|dQ/dt|$ of the differential coefficient becomes larger as the diameter of the spot SL is smaller.

To secure an exact reading of the bar code, the diameter (2R) of the spot SL must be smaller than the width of the thinnest of the bars which comprise the bar code. The resolving power of the bar code reader is maximized when the laser beam L is adjusted so as to minimize the diameter of the spot SL on the symbol surface 7.

To this end, the bar code reader of the present invention is so arranged that the control system 13 adjusts the first condensing lens 2 along the optical axis so as to obtain the maximum amplitude $|dQ/dt|$ of the differential coefficient. In this instance, the bar code 6 could be over the entire read range under the following conditions: the focal distance of the first condensing lens 2 is approximately 5 mm, the range of read distance (read range) is set at approximately 100 to 1000 mm, and a distance between the semiconductor laser 1 and the first condensing lens 2 is varied by approximately 0.23 mm. In this case, if a motor mechanism of 0.02 mm of the position accuracy and 10 kHz of the pulse rate is used for driving the first condensing lens 2, the full movement of the lens 2 can be completed within the period of about 1 msec. The lens 2 is discretely displaced every scan of the symbol surface 7, and the differential coefficient as detected every scan is successively compared with that as detected in the previous scan, so as to obtain the maximum differential coefficient.

Actually, the reflectivity in the white bar 21 portion is always 100% and that of the black bar 22 portion is always 0%. Further, the power distribution within the spot SL is not uniform but generally depends on the Gaussian distribution, and is therefore more complicated. In the present bar code reader, however, the reflectivity and the power distribution do not become problematic, because the maximum differential coefficient is obtained in a manner that the symbol surface 7 is scanned several times and the differential coefficients of the reflected light amounts as obtained through the several scanning operations are compared one with another. Even if no bar is present within the visual field, a change of the reflectivity, if present, leads necessarily to a change of the differential coefficient. Then, the focal position can always be adjusted regardless of the presence or absence of the bar code. In this case, it is necessary to neglect a differential coefficient of the reflected light amount that is caused when the laser beam L is emitted outside a housing (not shown) containing the arrangement shown in FIG. 1 or when the external light enters the inside of the housing.

As described above, the bar code reader of the invention can accurately read the bar code 6 over a broad read range by focusing the laser beam L from the semiconductor laser 1 on the symbol surface 7, without using the distance measuring means. Further, the bar code reader deals with the matters concerning various different optical lengths from the semiconductor laser 1 to the symbol surface 7 by displacing the first condensing lens 2 along the optical axis. This feature realizes a simple and inexpensive auto focusing operation. Additionally, the optoelectric transducing element 10 can detect the reflected light in good conditions, because the laser beam L emitted from the semiconductor laser 1 is always derived from the optical axis of the first condensing lens 2, and the directivity of the laser beam L is good.

It should be understood that the present invention is not limited to the above-mentioned embodiment, but may variously be changed and modified within the scope of the invention. For example, the semiconductor laser 1 may be replaced by any other suitable light source, such as a gas laser, e.g., an He - Ne laser. The motor drive mechanism for moving the first condensing lens 2 may be replaced by another suitable drive mechanism. Both the first condensing lens 2 and the semiconductor laser 1 may be displaced along the optical axis of the lens 2, although only the lens 2 is displaced in the embodiment.

The differential circuit 11 is preferably constructed with hardware. Alternatively, it may be realized in a manner that an electrical signal from the optoelectric converting element 10 is converted into a digital signal, and the digital signal is processed by a microcomputer in a software manner. In the embodiment as mentioned above, the present invention is embodied in the form of the bar code reader, but it is readily applicable for any other symbol reader in which a symbol is formed on the symbol surface by utilizing contrast, such as an optical character reader.

What is claimed is:

1. A symbol reader for reading a symbol from a symbol surface, comprising:
   means for illuminating the symbol surface with a read beam of light, the illuminating means including:
      a light source,
      a first condensing lens for condensing light from the light source, and
      scan mirror means for scanning a symbol surface and symbols to be read with light transmitted through the first condensing lens;
   a transducing element for receiving light reflected from the symbols and symbol surface, and producing a read signal indicative of the intensity of reflected light;
   differential coefficient means, responsive to the read signal, for providing a differential coefficient indicative of intensity change in the reflected light;
   control means, responsive to the differential coefficient, for adjusting a distance between said first condensing lens and said light source to maximize the amplitude of the differential coefficient; and
   means for processing the read signal so as to interpret the scanned symbols.

2. A device according to claim 1 wherein the scan mirror means comprises a movable mirrored surface element.

3. A device according to claim 1, wherein the scan mirror means comprises a mirrored surface element which can revolve in a fixed plane about its central axis.

4. A device according to claim 1, wherein the scan mirror means comprises an element having a plurality of reflecting and polarizing surfaces.

5. A device according to claim 1, wherein the scan mirror means comprises a polygon-shaped element having a plurality of reflecting and polarizing surfaces.

6. A device according to claim 1, further comprising a second condensing lens positioned so as focus light from the symbol surface onto the transducing element.

7. A device according to claim 1, wherein the differential coefficient means comprises:
   a differential circuit for determining the differential coefficient from the read signal,
   storage means for storing the maximum or minimum amplitude value of the differential coefficient, and
   means for outputting the stored value as the differential coefficient.

8. A device according to claim 1, wherein the differential coefficient means comprises a hardwired circuit.

9. A device according to claim 1, wherein the differential coefficient means comprises:
   means for converting the read signal into a digital signal; and
   microcomputer means for processing the digital signal to provide the differential coefficient.

10. A device according to claim 1, wherein the control means comprises means for displacing the first condensing lens in a direction along the optical axis of the first condensing lens.

11. A device according to claim 10 wherein the means for displacing the first condensing lens comprises a motor and drive arrangement.

12. A device according to claim 10, wherein the control means further comprises means for displacing the light source in a direction along the optical axis of the first condensing lens.

13. A device according to claim 1, wherein the control means comprises means for displacing the light source in a direction along the optical axis of the first condensing lens.

14. A device according to claim 1 wherein the light source is a semiconductor laser.

15. A device according to claim 1 wherein the light source is a gas laser.

* * * * *